US012402054B2

United States Patent
Byun et al.

(10) Patent No.: US 12,402,054 B2
(45) Date of Patent: Aug. 26, 2025

(54) METHOD AND APPARATUS FOR SUPPORTING A DAPS HANDOVER PROCEDURE IN A WIRELESS COMMUNICATION SYSTEM

(71) Applicant: LG ELECTRONICS INC., Seoul (KR)

(72) Inventors: Daewook Byun, Seoul (KR); Hongsuk Kim, Seoul (KR); Jian Xu, Seoul (KR); Seokjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 362 days.

(21) Appl. No.: 17/905,579

(22) PCT Filed: Mar. 5, 2021

(86) PCT No.: PCT/KR2021/002762
§ 371 (c)(1),
(2) Date: Sep. 2, 2022

(87) PCT Pub. No.: WO2021/182807
PCT Pub. Date: Sep. 16, 2021

(65) Prior Publication Data
US 2023/0119118 A1    Apr. 20, 2023

(30) Foreign Application Priority Data
Mar. 9, 2020   (KR) .................. 10-2020-0028941

(51) Int. Cl.
*H04W 36/18*   (2009.01)
*H04W 36/00*   (2009.01)
*H04W 36/08*   (2009.01)

(52) U.S. Cl.
CPC ..... *H04W 36/185* (2023.05); *H04W 36/0064* (2023.05); *H04W 36/08* (2013.01)

(58) Field of Classification Search
CPC ......... H04W 36/0064; H04W 36/0079; H04W 36/08; H04W 36/185
See application file for complete search history.

(56) References Cited

U.S. PATENT DOCUMENTS

2021/0014764 A1    1/2021  Zhang et al.
2022/0361060 A1*  11/2022  Wallentin ........ H04W 36/00837
(Continued)

FOREIGN PATENT DOCUMENTS

WO    2020-088592    5/2020
WO    2020-210077   10/2020

OTHER PUBLICATIONS

PCT International Application No. PCT/KR2021/002762, International Search Report dated May 31, 2021, 1 page.
(Continued)

*Primary Examiner* — Timothy X Pham
(74) *Attorney, Agent, or Firm* — LEE, HONG, DEGERMAN, KANG & WAIMEY

(57) ABSTRACT

A method and apparatus for supporting a DAPS handover procedure in a wireless communication system is provided. A target BS receives, from a source BS, a first message for a dual active protocol stack (DAPS) handover of a wireless device. A target BS transmits, to the source BS, a second message to inform that the DAPS handover is accepted. A target BS receives, from the wireless device, a third message including an information that the wireless device does not perform the DAPS handover. A target BS transmits, to the source BS, a fourth message including the information received from the wireless device.

12 Claims, 11 Drawing Sheets

(56) References Cited

U.S. PATENT DOCUMENTS

2023/0189097 A1* 6/2023 Ali .................. H04W 36/362
                                                        370/330
2023/0292214 A1* 9/2023 Yan ................ H04W 36/00835
2024/0172062 A1* 5/2024 Ramachandra ...........................
                                                   H04W 36/00833

OTHER PUBLICATIONS

CMCC, "Combination of CHO and DAPS HO," R2-2000923, 3GPP TSG-RAN WG2 Meeting #109 electronic, Mar. 2020, 7 pages.
Apple Inc., "Return CHO Configuration," R2-2000592, 3GPP TSG-RAN WG2 Meeting #109 electronic, Mar. 2020, 8 pages.
Qualcomm Incorporated, "Source connection handling during DAPS HO," R2-1912295, 3GPP TSG-RAN WG2 Meeting #107bis, Oct. 2019, 6 pages.
Ericsson, "Capability coordination for DAPS Handover," Tdoc R2-1914625, 3GPP TSG-RAN WG2 #108, Nov. 2019, 6 pages.
ZTE Corporation, et al., "Discussion on capability coordination for RUDI HO," R2-1913486, 3GPP TSG RAN WG2 Meeting #107bis, Oct. 2019, 8 pages.

* cited by examiner

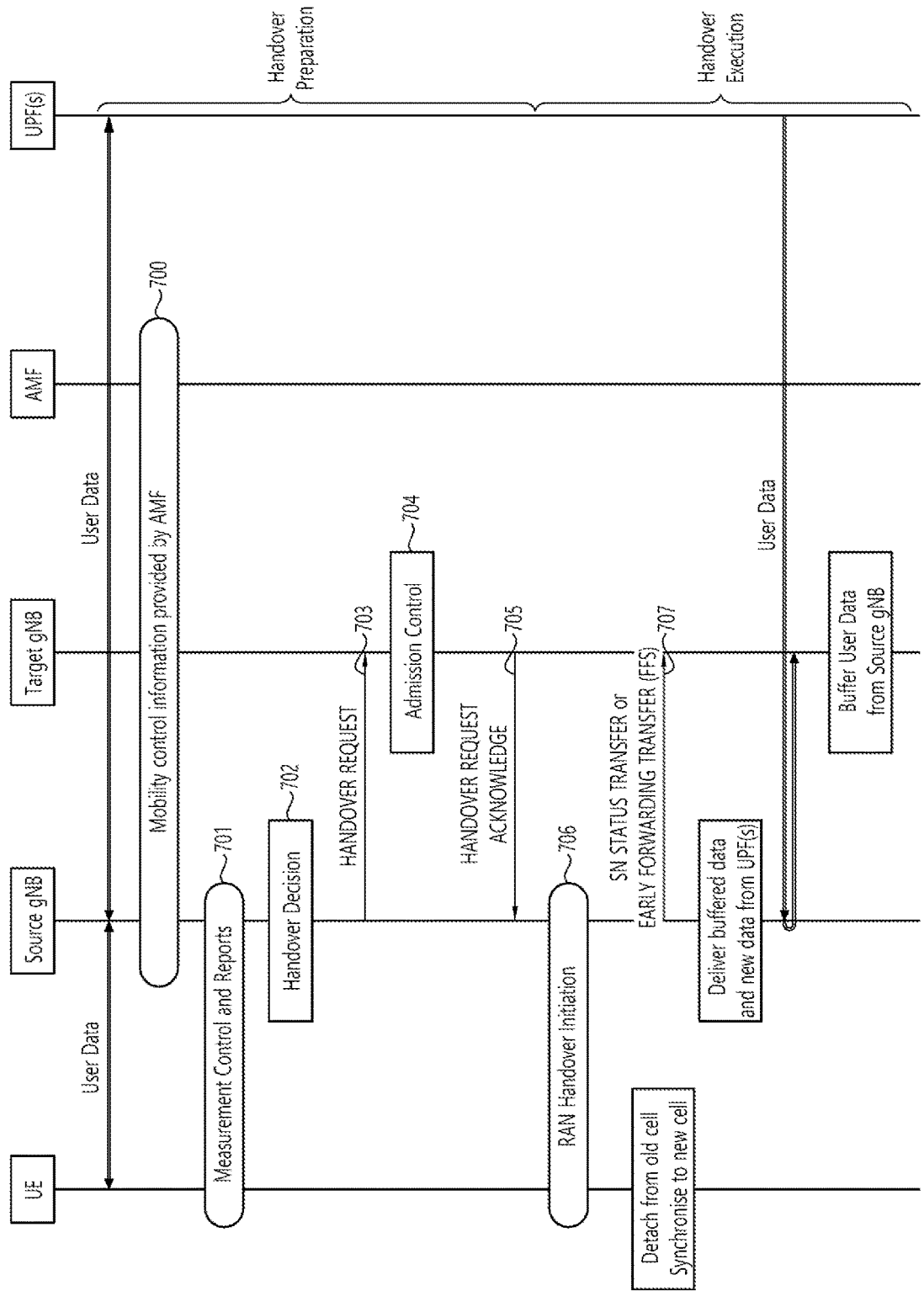

METHOD AND APPARATUS FOR SUPPORTING A DAPS HANDOVER PROCEDURE IN A WIRELESS COMMUNICATION SYSTEM

CROSS-REFERENCE TO RELATED APPLICATION(S)

This application is the National Stage filing under 35 U.S.C. 371 of International Application No. PCT/KR2021/002762, filed on Mar. 5, 2021, which claims the benefit of earlier filing date and right of priority to Korean Application No. 10-2020-0028941, filed on Mar. 9, 2020, the contents of which are all hereby incorporated by reference herein in their entireties.

TECHNICAL FIELD

The present disclosure relates to a method and apparatus for supporting a DAPS handover procedure in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

Technical Objects

In NR, dual active protocol stack (DAPS) handover may be supported. This handover may reduce interruption during handover close to 0 ms by maintaining the source cell radio link while establishing the target cell radio link.

When the UE receives the DAPS related information included into the RRCReconfiguration message from the source gNB, the UE may decide to perform a legacy handover though the UE should do DAPS handover. It is because the UE may perceive that capability of the UE for DAPS handover is exceeded or the UE may not have the transmitting data toward the source gNB. In this case, the source gNB cannot know why RRC connection with the UE is disconnected. As a result, interruption during handover of this UE has no choice but to be increased.

Therefore, studies for supporting a DAPS handover procedure in a wireless communication system are needed.

Technical Solutions

In an aspect, a method performed by a target base station (BS) in a wireless communication system is provided. A target BS receives, from a source BS, a first message for a dual active protocol stack (DAPS) handover of a wireless device. A target BS transmits, to the source BS, a second message to inform that the DAPS handover is accepted. A target BS receives, from the wireless device, a third message including an information that the wireless device does not perform the DAPS handover. A target BS transmits, to the source BS, a fourth message including the information received from the wireless device.

In another aspect, an apparatus for implementing the above method is provided.

Technical Effects

The present disclosure may have various advantageous effects.

According to some embodiments of the present disclosure, a Radio Access Network (RAN) node (for example, a base station such as an eNB or a gNB) could efficiently support a DAPS handover procedure in a wireless communication system.

For example, the source BS can identify that a legacy handover for the UE was performed though the source BS determined a DAPS handover for the UE.

For example, based on this knowledge, the source BS can optimize the criteria or condition for decision of a DAPS handover.

For example, it could be prevented to perform a legacy handover for the UE which should do a DAPS handover.

According to some embodiments of the present disclosure, a wireless communication system could provide an efficient solution for supporting a DAPS handover procedure.

For example, a wireless communication system could avoid the degradation of UE's experience by reducing interruption through DAPS handover.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIGS. 7A and 7B show an example of Intra-AMF/UPF Handover procedure in a 3GPP based wireless communication system to which implementations of the present disclosure is applied.

DETAILED DESCRIPTION

Figure 1:
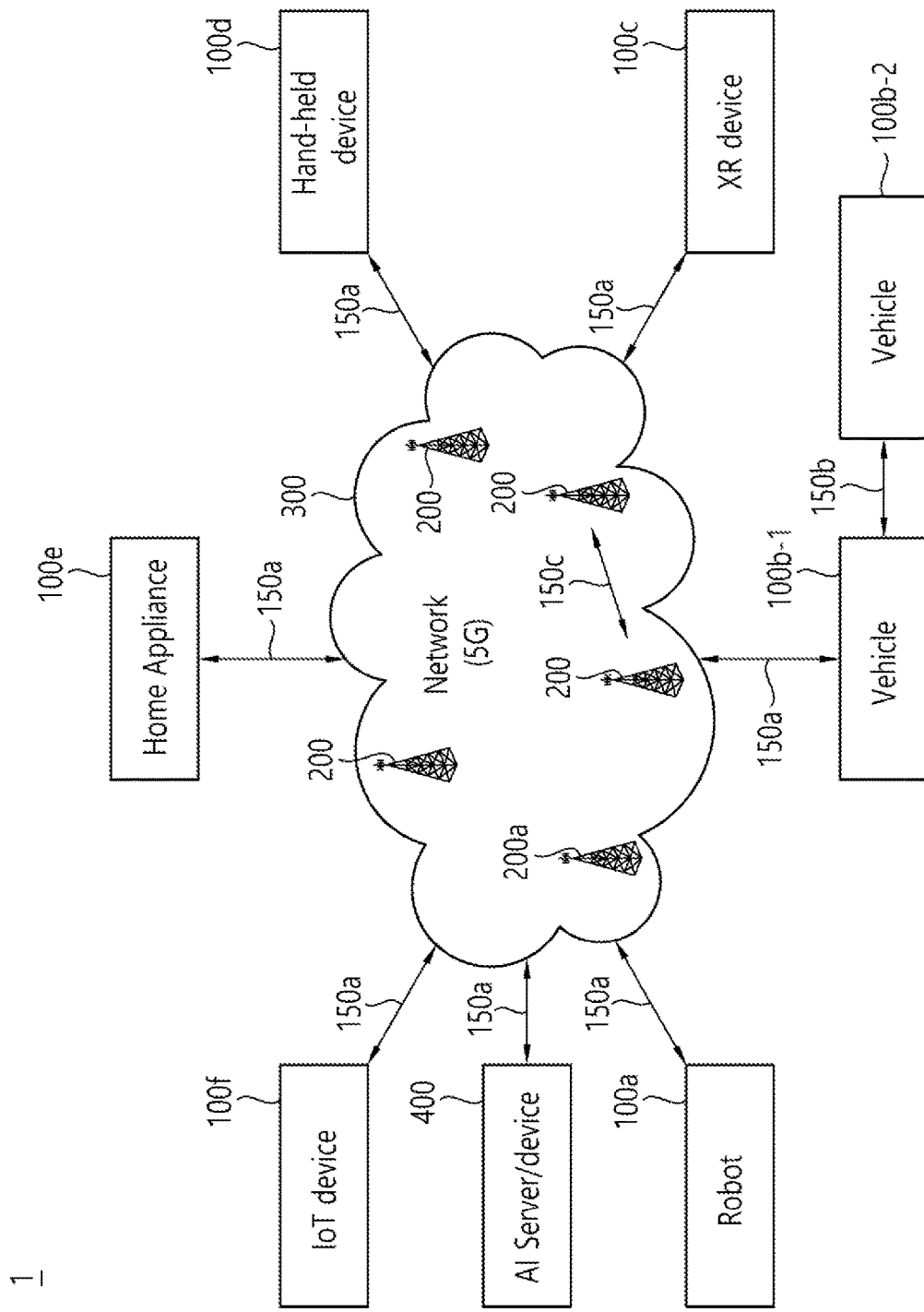
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bi-directional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BS s 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
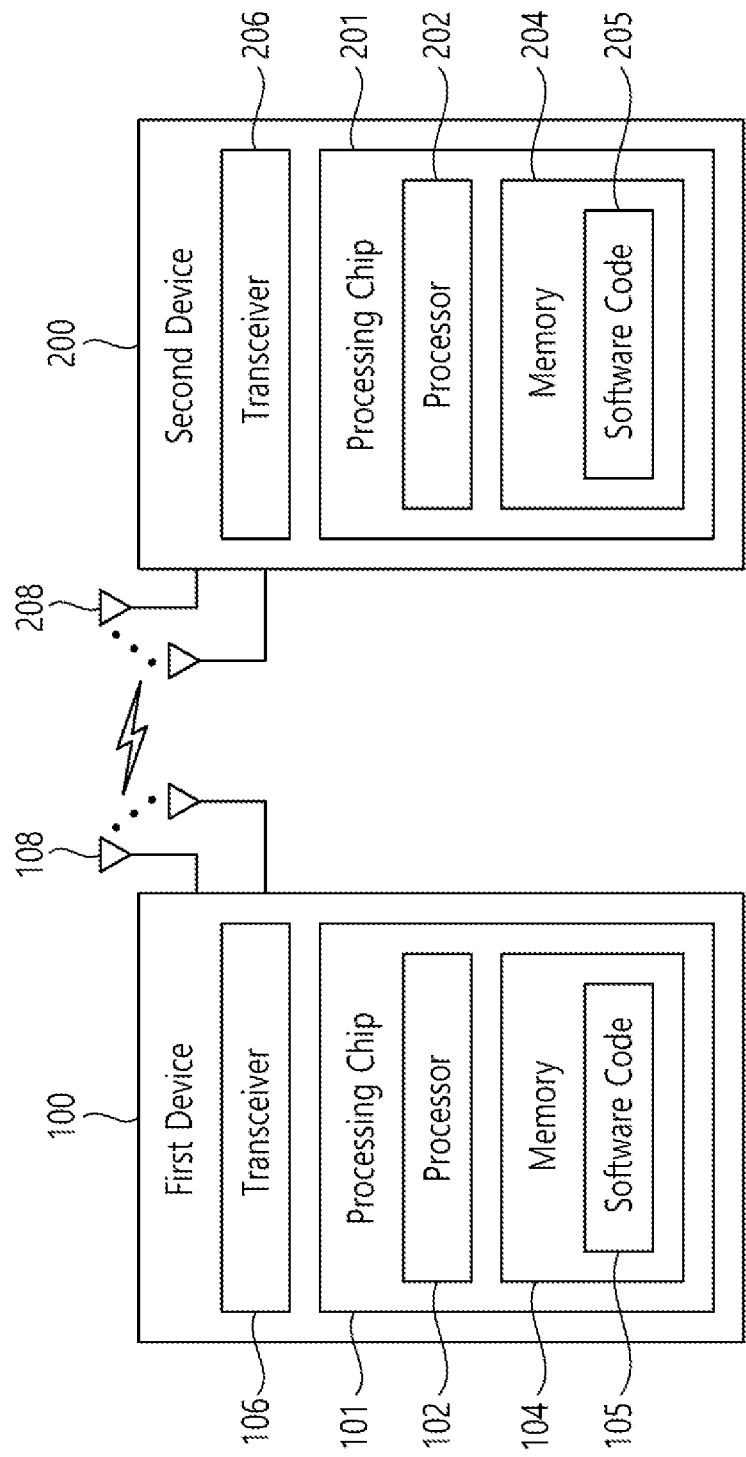
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
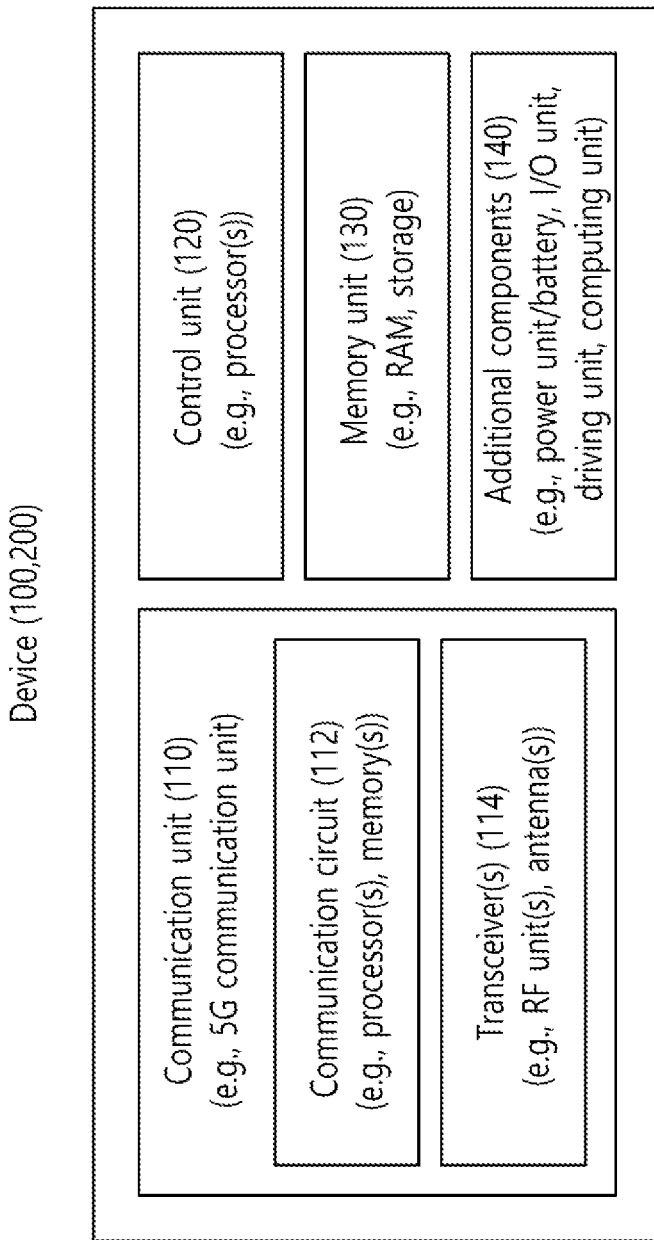
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BS s (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
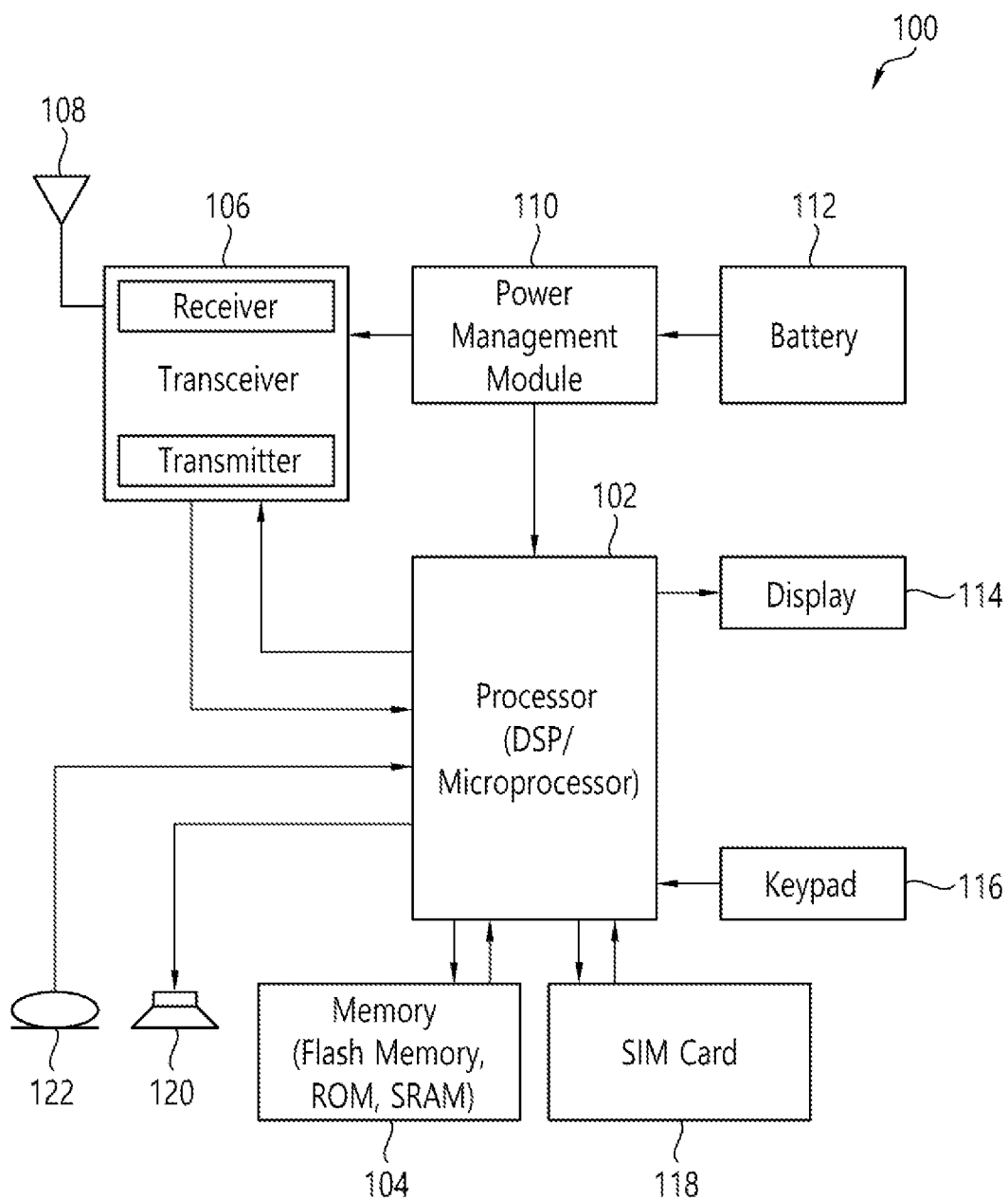
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
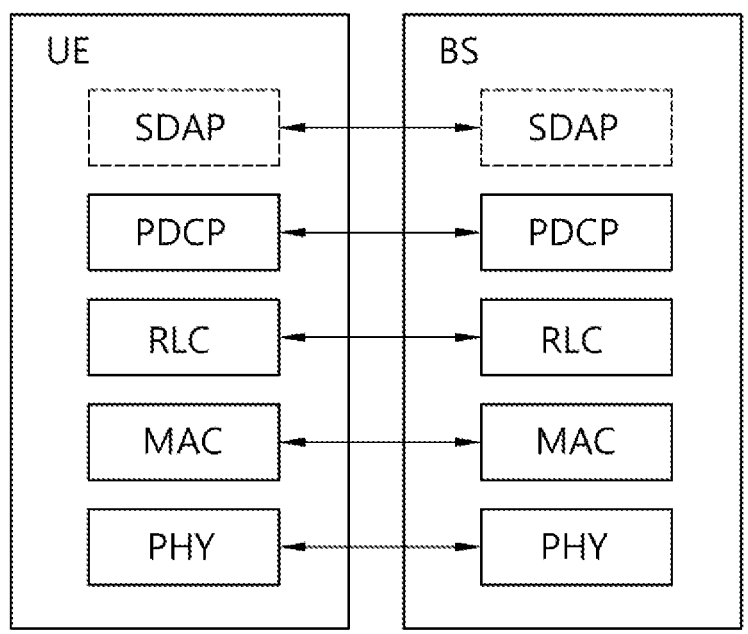
FIGS. 5 and 6 show an example of protocol stacks in a 3GPP based wireless communication system to which implementations of the present disclosure is applied.
Figure 6:
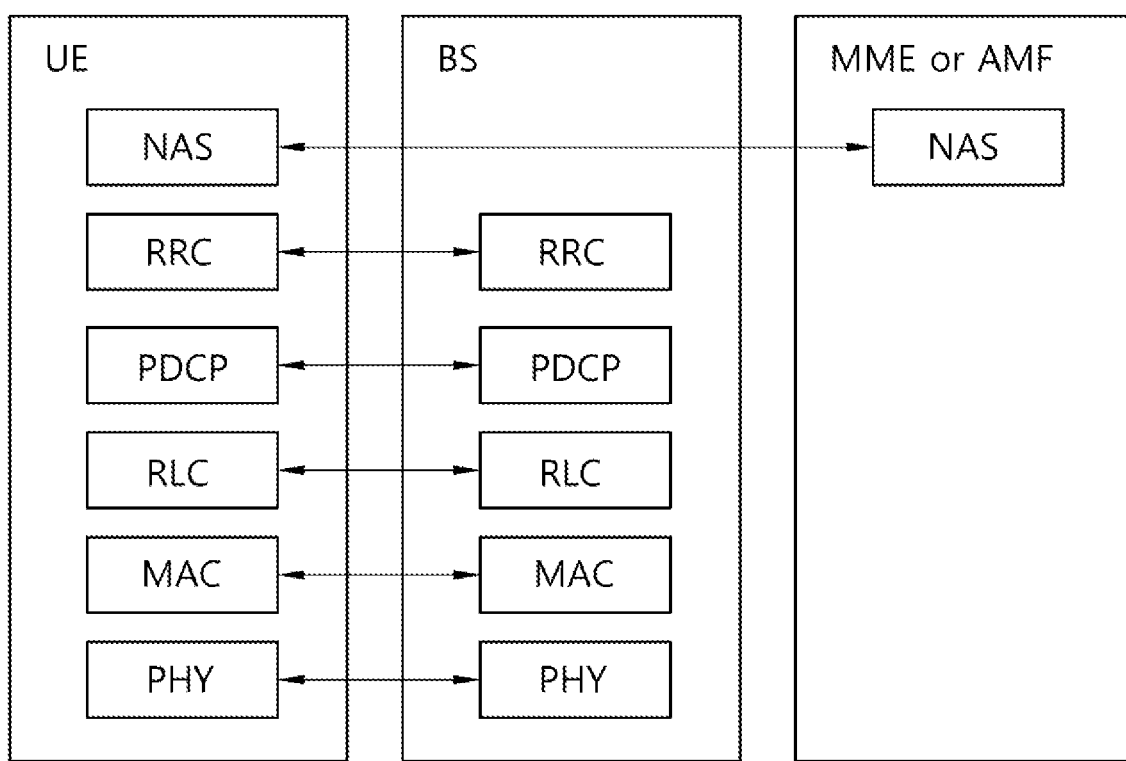

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Hereinafter, handover preparation procedure is described.

This procedure is used to establish necessary resources in an NG-RAN node for an incoming handover. If the procedure concerns a conditional handover, parallel transactions are allowed. Possible parallel requests are identified with the target cell ID when the source UE AP IDs are the same.

The procedure uses UE-associated signalling.

Successful operation for handover preparation is described.

The source NG-RAN node initiates the procedure by sending the HANDOVER REQUEST message to the target NG-RAN node. When the source NG-RAN node sends the HANDOVER REQUEST message, it shall start the timer $TXn_{RELOCprep}$.

If the Conditional Handover Information IE is contained in the HANDOVER REQUEST message, the target NG-RAN node shall consider that the request concerns a conditional handover and shall include the Requested Target Cell ID IE in the HANDOVER REQUEST ACKNOWLEDGE message.

If the Target NG-RAN node UE XnAP ID IE is contained in the Conditional Handover Information IE included in the HANDOVER REQUEST message, then the target NG-RAN node shall remove the existing prepared conditional HO identified by the Target NG-RAN node UE XnAP ID IE and the Target Cell Global ID IE.

Upon reception of the HANDOVER REQUEST ACKNOWLEDGE message, the source NG-RAN node shall stop the timer $TXn_{RELOCprep}$ and terminate the Handover Preparation procedure. If the procedure was initiated for an immediate handover, the source NG-RAN node shall start the timer $TXn_{RELocoveran}$. The source NG-RAN node is then defined to have a Prepared Handover for that Xn UE-associated signalling.

For each E-RAB ID IE included in the QoS Flow To Be Setup List IE in the HANDOVER REQUEST message, the target NG-RAN node shall, if supported, store the content of the IE in the UE context and use it for subsequent inter-system handover.

If the Masked IMEISV IE is contained in the HANDOVER REQUEST message the target NG-RAN node shall, if supported, use it to determine the characteristics of the UE for subsequent handling.

At reception of the HANDOVER REQUEST message the target NG-RAN node shall prepare the configuration of the AS security relation between the UE and the target NG-RAN node by using the information in the UE Security Capabilities IE and the AS Security Information IE in the UE Context Information IE.

Upon reception of the PDU Session Resource Setup List IE, contained in the HANDOVER REQUEST message, the target NG-RAN node shall behave for the PDU Session Resource Setup procedure. The target NG-RAN node shall report in the HANDOVER REQUEST ACKNOWLEDGE message the successful establishment of the result for all the requested PDU session resources. When the target NG-RAN node reports the unsuccessful establishment of a PDU session resource, the cause value should be precise enough to enable the source NG-RAN node to know the reason for the unsuccessful establishment.

For each PDU session if the PDU Session Aggregate Maximum Bit Rate IE is included in the PDU Session Resources To Be Setup List IE contained in the HANDOVER REQUEST message, the target NG-RAN node shall store the received PDU Session Aggregate Maximum Bit Rate in the UE context and use it when enforcing traffic policing for Non-GBR QoS flows for the concerned UE.

For each QoS flow for which the source NG-RAN node proposes to perform forwarding of downlink data, the source NG-RAN node shall include the DL Forwarding IE set to "DL forwarding proposed" within the Data Forwarding and Offloading Info from source NG-RAN node IE in the PDU Session Resources To Be Setup List IE in the HANDOVER REQUEST message. For each PDU session that the target NG-RAN node decides to admit the data forwarding for at least one QoS flow, the target NG-RAN node includes the PDU Session level DL data forwarding GTP-U Tunnel Endpoint IE within the Data Forwarding Info from target NG-RAN node IE in the PDU Session Resource Admitted Info IE contained in the PDU Session Resources Admitted List IE in the HANDOVER REQUEST ACKNOWLEDGE message.

For each QoS flow for which the source NG-RAN node has not yet received the SDAP end marker packet if QoS flow re-mapping happened before handover, the source NG-RAN node shall include the UL Forwarding Proposal IE within the Data Forwarding and Offloading Info from source NG-RAN node IE in the HANDOVER REQUEST message, and if the target NG-RAN node decides to admit uplink data forwarding for at least one QoS flow, the target NG-RAN node may include the PDU Session Level UL Data Forwarding UP TNL Information IE in the Data Forwarding Info from target NG-RAN node IE in the PDU Session Resources Admitted Item IE contained in the PDU Session Resources Admitted List IE in the HANDOVER REQUEST ACKNOWLEDGE message to indicate that it accepts the uplink data forwarding.

For each PDU session resource successfully setup at the target NG-RAN, the target NG-RAN node may allocate resources for additional Xn-U PDU session resource GTP-U tunnels, indicated in the Secondary Data Forwarding Info from target NG-RAN node List IE.

For each DRB for which the source NG-RAN node proposes to perform forwarding of downlink data, the source NG-RAN node shall include the DRB ID IE and the mapped QoS Flows List IE within the Source DRB to QoS Flow Mapping List IE contained in the PDU Session Resources To Be Setup List IE in the HANDOVER REQUEST message. The source NG-RAN node may include the QoS Flow Mapping Indication IE in the Source DRB to QoS Flow Mapping List IE to indicate that only the uplink or downlink QoS flow is mapped to the DRB. If the target NG-RAN node decides to use the same DRB configuration and to map the same QoS flows as the source NG-RAN node, the target NG-RAN node includes the DL Forwarding GTP Tunnel Endpoint IE within the Data Forwarding Response DRB List IE in the HANDOVER REQUEST ACKNOWLEDGE message to indicate that it accepts the proposed forwarding of downlink data for this DRB.

If the HANDOVER REQUEST ACKNOWLEDGE message contains the UL Forwarding GTP Tunnel Endpoint IE for a given DRB in the Data Forwarding Response DRB List IE within Data Forwarding Info from target NG-RAN node IE in the PDU Session Resources Admitted List IE and the source NG-RAN node accepts the data forwarding proposed by the target NG-RAN node, the source NG-RAN node shall perform forwarding of uplink data for the DRB.

If the HANDOVER REQUEST includes PDU session resources for PDU sessions associated to S-NSSAIs not supported by target NG-RAN, the target NG-RAN shall reject such PDU session resources. In this case, and if at least one PDU Session Resource To Be Setup Item IE is admitted, the target NG-RAN shall send the HANDOVER REQUEST ACKNOWLEDGE message including the PDU Session Resources Not Admitted List IE listing corresponding PDU sessions rejected at the target NG-RAN.

If the Mobility Restriction List IE is
- contained in the HANDOVER REQUEST message, the target NG-RAN node shall
- store the information received in the Mobility Restriction List IE in the UE context;
- use this information to determine a target for the UE during subsequent mobility action for which the NG-RAN node provides information about the target of the mobility action towards the UE, except when one of the PDU sessions has a particular ARP value in which case the information shall not apply;
- use this information to select a proper SCG during dual connectivity operation.
- use this information to select proper RNA(s) for the UE when moving the UE to RRC_INACTIVE.
- not contained in the HANDOVER REQUEST message, the target NG-RAN node shall
- consider that no roaming and no access restriction apply to the UE.

If the Trace Activation IE is included in the HANDOVER REQUEST message the target NG-RAN node shall, if supported, initiate the requested trace function.

If the Index to RAT/Frequency Selection Priority IE is contained in the HANDOVER REQUEST message, the target NG-RAN node shall store this information and use it.

If the UE Context Reference at the S-NG-RAN IE is contained in the HANDOVER REQUEST message the target NG-RAN node may use it. In this case, the source NG-RAN node may expect the target NG-RAN node to include the UE Context Kept Indicator IE set to "True" in the HANDOVER REQUEST ACKNOWLEDGE message, which shall use this information.

If the UE Context Kept Indicator IE set to "True" is included, then, if the DRBs transferred to MN IE is included in the HANDOVER REQUEST ACKNOWLEDGE message, the source NG-RAN node shall, if supported, include the uplink/downlink PDCP SN and HFN status received from the S-NG-RAN node in the SN Status Transfer procedure towards the target NG-RAN node.

For each PDU session, if the Network Instance IE is included in the PDU Session Resource To Be Setup List IE and the Common Network Instance IE is not present, the target NG-RAN node shall, if supported, use it when selecting transport network resource.

For each PDU session, if the Common Network Instance IE is included in the PDU Session Resource To Be Setup List IE, the target NG-RAN node shall, if supported, use it when selecting transport network resource.

For each PDU session for which the Security Indication IE is included in the PDU Session Resource To Be Setup List IE and the Integrity Protection Indication IE or Confidentiality Protection Indication IE is set to "required", the target NG-RAN node shall perform user plane integrity protection or ciphering, respectively. If the NG-RAN node is not able to perform the user plane integrity protection or ciphering, it shall reject the setup of the PDU Session Resources with an appropriate cause value.

If the NG-RAN node is an ng-eNB, it shall reject all PDU sessions for which the Integrity Protection Indication IE is set to "required".

For each PDU session for which the Security Indication IE is included in the PDU Session Resource To Be Setup List IE and the Integrity Protection Indication IE or the Confidentiality Protection Indication IE is set to "preferred", the target NG-RAN node should, if supported, perform user plane integrity protection or ciphering, respectively and shall notify the SMF whether it succeeded the user plane integrity protection or ciphering or not for the concerned security policy.

For each PDU session for which the Maximum Integrity Protected Data Rate IE is included in the Security Indication IE in the PDU Session Resources To Be Setup List IE, the NG-RAN node shall store the respective information and, if integrity protection is to be performed for the PDU session, it shall enforce the traffic corresponding to the received Maximum Integrity Protected Data Rate IE, for the concerned PDU session and concerned UE.

For each PDU session for which the Security Indication IE is included in the PDU Session Resource To Be Setup List IE and the Integrity Protection Indication IE or Confidentiality Protection Indication IE is set to "not needed", the target NG-RAN node shall not perform user plane integrity protection or ciphering, respectively, for the concerned PDU session.

For each PDU session, if the Additional UL NG-U UP TNL Information List IE is included in the PDU Session Resources To Be Setup List IE contained in the HANDOVER REQUEST message, the target NG-RAN node may forward the UP transport layer information to the target S-NG-RAN node as the uplink termination point for the user plane data for this PDU session split in different tunnel.

If the Location Reporting Information IE is included in the HANDOVER REQUEST message, then the target NG-RAN node should initiate the requested location reporting functionality.

Upon reception of UE History Information IE in the HANDOVER REQUEST message, the target NG-RAN node shall collect the information defined as mandatory in the UE History Information IE and shall, if supported, collect the information defined as optional in the UE History Information IE, for as long as the UE stays in one of its cells, and store the collected information to be used for future handover preparations.

Unsuccessful operation for handover preparation is described.

If the target NG-RAN node does not admit at least one PDU session resource, or a failure occurs during the Handover Preparation, the target NG-RAN node shall send the HANDOVER PREPARATION FAILURE message to the source NG-RAN node. The message shall contain the Cause IE with an appropriate value.

If the Conditional Handover Information IE is contained in the HANDOVER REQUEST message and the target NG-RAN node rejects the handover or a failure occurs during the Handover Preparation, the target NG-RAN node shall include the Requested Target Cell ID IE in the HANDOVER PREPARATION FAILURE message.

Interactions with Handover Cancel procedure:

If there is no response from the target NG-RAN node to the HANDOVER REQUEST message before timer $TXn_{RELOCprep}$ expires in the source NG-RAN node, the source NG-RAN node should cancel the Handover Preparation procedure towards the target NG-RAN node by initiating the Handover Cancel procedure with the appropriate value for the Cause IE. The source NG-RAN node shall ignore any HANDOVER REQUEST ACKNOWLEDGE or HANDOVER PREPARATION FAILURE message received after the initiation of the Handover Cancel procedure and remove any reference and release any resources related to the concerned Xn UE-associated signalling.

Abnormal Conditions are described.

If the supported algorithms for encryption defined in the UE Security Capabilities IE in the UE Context Information IE, plus the mandated support of the EEA0 and NEA0 algorithms in all UEs, do not match any allowed encryption algorithms defined in the configured list of allowed encryption algorithms in the NG-RAN node, the NG-RAN node shall reject the procedure using the HANDOVER PREPARATION FAILURE message.

If the supported algorithms for integrity defined in the UE Security Capabilities IE in the UE Context Information IE, plus the mandated support of the EIA0 and NIA0 algorithms in all UEs, do not match any allowed algorithms defined in the configured list of allowed integrity protection algorithms in the NG-RAN node, the NG-RAN node shall reject the procedure using the HANDOVER PREPARATION FAILURE message.

If the Target NG-RAN node UE XnAP ID IE is contained in the Conditional Handover Information IE included in the HANDOVER REQUEST message, but there is no CHO prepared for this Target NG-RAN node UE XnAP ID, or the CHO is prepared for a different target cell than the Target Cell Global ID IE, the NG-RAN node shall reject the procedure using the HANDOVER PREPARATION FAILURE message.

SN Status Transfer procedure is described.

The purpose of the SN Status Transfer procedure is to transfer the uplink PDCP SN and HFN receiver status and the downlink PDCP SN and HFN transmitter status either, from the source to the target NG-RAN node during an Xn handover, between the NG-RAN nodes involved in dual connectivity, or after retrieval of a UE context for RRC reestablishment, for each respective DRB of the source DRB configuration for which PDCP SN and HFN status preservation applies.

In case that the Xn handover is a DAPS handover, the SN Status Transfer procedure may also be used to transfer the uplink PDCP SN and HFN receiver status, or the downlink PDCP SN and HFN transmitter status for a DRB associated with RLC-UM.

If the SN Status Transfer procedure is applied in the course of dual connectivity or RRC connection re-establishment in the subsequent specification text
    the behaviour of the NG-RAN node from which the DRB context is transferred, i.e. the NG-RAN node involved in dual connectivity or RRC connection re-establishment, from which data is forwarded, is specified by the behaviour of the "source NG-RAN node", the behaviour of the NG-RAN node to which the DRB context is transferred, i.e., the NG-RAN node involved in dual connectivity or RRC connection re-establishment, to which data is forwarded, is specified by the behaviour of the "target NG-RAN node".

The procedure uses UE-associated signalling.

Successful operation for SN Status transfer is described.

The source NG-RAN node initiates the procedure by stop assigning PDCP SNs to downlink SDUs and stop delivering UL SDUs towards the 5GC and sending the SN STATUS TRANSFER message to the target NG-RAN node at the time point when it considers the transmitter/receiver status to be frozen. The target NG-RAN node using full configuration for this handover or for the MR-DC operations shall ignore the information received in this message. In case of MR-DC, if the target NG-RAN node performs PDCP SN length change or RLC mode change for a DRB, it shall ignore the information received for that DRB in this message.

In case that the Xn handover is a DAPS handover, the source NG-RAN node may continue assigning PDCP SNs to downlink SDUs and delivering uplink SDUs toward the 5GC when initiating this procedure.

For each DRB in the DRBs Subject to Status Transfer List IE, the source NG-RAN node shall include the DRB ID IE, the UL COUNT Value IE and the DL COUNT Value IE.

The source NG-RAN node may also include in the SN STATUS TRANSFER message the missing and the received uplink SDUs in the Receive Status of UL PDCP SDUs IE for each DRB for which the source NG-RAN node has accepted the request from the target NG-RAN node for uplink forwarding.

For each DRB in the DRBs Subject to Status Transfer List IE, the target NG-RAN node shall not deliver any uplink packet which has a PDCP-SN lower than the value contained within the UL COUNT Value IE.

For each DRB in the DRBs Subject to Status Transfer List IE, the target NG-RAN node shall use the value of the PDCP SN contained within the DL COUNT Value IE for the first downlink packet for which there is no PDCP-SN yet assigned. In case that the Xn handover is a DAPS handover, the target NG-RAN node shall use the value of the DL COUNT Value IE conveyed for the first time for a DRB, as the PDCP SN and HFN of the first PDCP SDU that the source NG-RAN nodes forwards to the target NG-RAN node.

If the Receive Status of UL PDCP SDUs IE is included for at least one DRB in the SN STATUS TRANSFER message, the target NG-RAN node may use it in a Status Report message sent to the UE over the radio interface.

If the SN STATUS TRANSFER message contains in the DRBs Subject To Status Transfer List IE the Old QoS Flow List-UL End Marker expected IE, the target NG-RAN shall be prepared to receive the SDAP end marker for the QoS flow via the corresponding DRB, as specified in TS 38.300 [8].

If the target NG-RAN node receives this message for a UE for which no prepared handover exists at the target NG-RAN node, the target NG-RAN node shall ignore the message.

Handover success procedure is described.

The handover success procedure is used during a conditional handover or a DAPS handover, to enable a target NG-RAN node to inform the source NG-RAN node that the UE has successfully accessed the target NG-RAN node.

The procedure uses UE-associated signalling.

Successful operation for handover success procedure is described.

The target NG-RAN node initiates the procedure by sending the HANDOVER SUCCESS message to the source NG-RAN node.

If late data forwarding was configured for this UE, the source NG-RAN node shall start data forwarding using the tunnel information related to the global target cell ID provided in the HANDOVER SUCCESS message.

When the source NG-RAN node receives the HANDOVER SUCCESS message, it shall consider all other CHO preparations accepted for this UE in the target NG-RAN node as cancelled.

Interactions with Other Procedures

If a CONDITIONAL HANDOVER CANCEL message was received for this UE prior the reception of the HANDOVER SUCCESS message, the source NG-RAN node shall consider that the UE successfully executed the handover.

If the HANDOVER SUCCESS message refers to a context that does not exist, the source NG-RAN node shall ignore the message.

Early Forwarding Transfer procedure is described.

The purpose of the Early Forwarding Transfer procedure is to transfer the COUNT of the first downlink SDU that the source NG-RAN node forwards to the target NG-RAN node or the COUNT for discarding of already forwarded downlink SDUs for respective DRB during DAPS Handover or Conditional Handover.

The procedure uses UE-associated signalling.

Successful operation for Early Forwarding Transfer procedure during DAPS Handover or Conditional Handover is described.

The DRBs Subject To Early Forwarding Transfer List IE included in the EARLY FORWARDING TRANSFER message contains the DRB ID(s) corresponding to the DRB(s) subject to be simultaneously served by the source and the target NG-RAN nodes during DAPS Handover or the DRB(s) transferred during Conditional Handover.

For each DRB in the DRBs Subject To Early Forwarding Transfer List IE, the target NG-RAN node shall use the value of the DL COUNT Value IE as the COUNT of the first downlink SDU that the source NG-RAN node forwards to the target NG-RAN node.

For each DRB in the DRBs Subject To Early Forwarding Transfer List IE for which the DISCARD DL COUNT Value IE is received in the EARLY FORWARDING TRANSFER message, the target NG-RAN node does not transmit forwarded downlink SDUs to the UE whose COUNT is less than the provided and discards them if transmission has not been attempted.

If the target NG-RAN node receives this message for a UE for which no prepared DAPS Handover or Conditional Handover exists at the target NG-RAN node, the target NG-RAN node shall ignore the message.

Dual Active Protocol Stack (DAPS) handover is described.

DAPS Handover is a handover procedure that maintains the source gNB connection after reception of RRC message for handover and until releasing the source cell after successful random access to the target gNB.

In case of DAPS handover, the UE continues the downlink user data reception from the source gNB until releasing the source cell and continues the uplink user data transmission to the source gNB until successful random access procedure to the target gNB.

For example, the UE establishes the RLC entity and an associated DTCH logical channel for target for each DRB configured with DAPS.

For example, the UE, for the DRB configured with DAPS, reconfigures the PDCP entity with separate security and ROHC functions for source and target and associates them with the RLC entities configured by source and target respectively.

Only PCell is kept during DAPS handover. All other serving cells are released by the network.

C-Plane handling procedure is described.

Figure 7B:
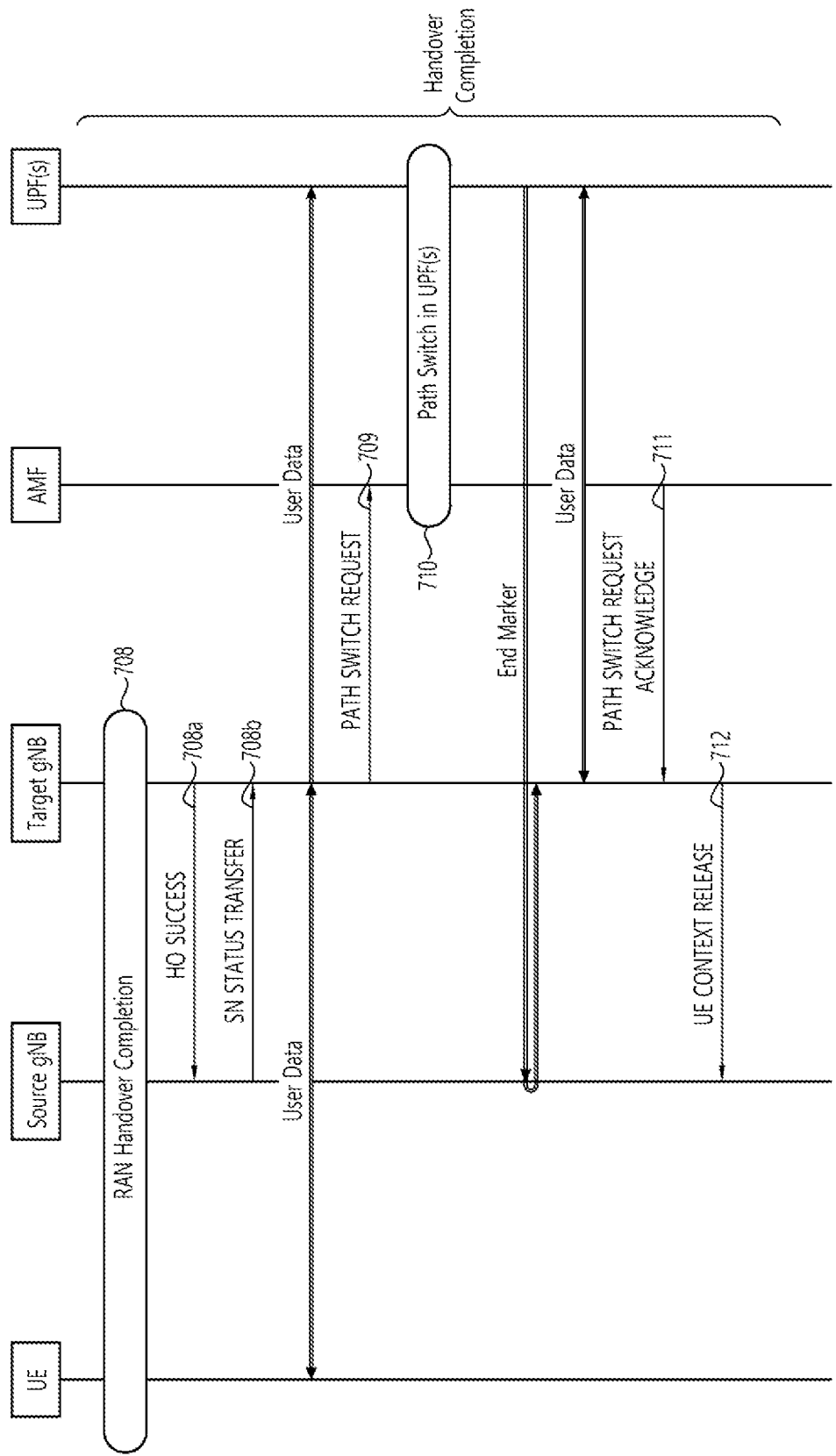

The intra-NR RAN handover performs the preparation and execution phase of the handover procedure performed without involvement of the 5GC, i.e. preparation messages are directly exchanged between the gNBs. The release of the resources at the source gNB during the handover completion phase is triggered by the target gNB. The figure below depicts the basic handover scenario where neither the AMF nor the UPF changes:

FIGS. 7A and 7B show an example of Intra-AMF/UPF Handover procedure in a 3GPP based wireless communication system to which implementations of the present disclosure is applied.

In step 700, the UE context within the source gNB contains information regarding roaming and access restrictions which were provided either at connection establishment or at the last TA update.

In step 701, the source gNB configures the UE measurement procedures and the UE reports according to the measurement configuration.

In step 702, the source gNB decides to handover the UE, based on MeasurementReport and RRM information.

In step 703, the source gNB issues a Handover Request message to the target gNB passing a transparent RRC container with necessary information to prepare the handover at the target side. The information includes at least the target cell ID, KgNB*, the C-RNTI of the UE in the source gNB, RRM-configuration including UE inactive time, basic AS-configuration including antenna Info and DL Carrier Frequency, the current QoS flow to DRB mapping rules applied to the UE, the SIB1 from source gNB, the UE capabilities for different RATs, PDU session related information, and can include the UE reported measurement information including beam-related information if available. The PDU session related information includes the slice information and QoS flow level QoS profile(s).

After issuing a Handover Request, the source gNB should not reconfigure the UE, including performing Reflective QoS flow to DRB mapping.

In step 704, admission Control may be performed by the target gNB. Slice-aware admission control shall be performed if the slice information is sent to the target gNB. If the PDU sessions are associated with non-supported slices the target gNB shall reject such PDU Sessions.

In step 705, the target gNB prepares the handover with L1/L2 and sends the HANDOVER REQUEST ACKNOWLEDGE to the source gNB, which includes a transparent container to be sent to the UE as an RRC message to perform the handover.

As soon as the source gNB receives the HANDOVER REQUEST ACKNOWLEDGE, or as soon as the transmission of the handover command is initiated in the downlink, data forwarding may be initiated.

For DAPS Handover, downlink PDCP SDUs are forwarded with SN assigned by the source gNB for DRB s subject to be simultaneously served by both the source and target gNB s, regardless of RLC-AM or RLC-UM, until SN assignment is handed over to the target gNB in step 708*b*, for which the normal data forwarding follows.

In step 706, the source gNB triggers the Uu handover by sending an RRCReconfiguration message to the UE, containing the information required to access the target cell: at least the target cell ID, the new C-RNTI, the target gNB security algorithm identifiers for the selected security algorithms. It can also include a set of dedicated RACH resources, the association between RACH resources and SSB(s), the association between RACH resources and UE-specific CSI-RS configuration(s), common RACH resources, and system information of the target cell, etc.

In case of DAPS Handover, for DRBs subject to be simultaneously served by the source and the target gNB s, the source gNB does not stop transmitting downlink packets until it receives the HO SUCCESS message from the target gNB in step 708*a*.

In step 707, the source gNB sends the SN STATUS TRANSFER message to the target gNB to convey the uplink PDCP SN receiver status and the downlink PDCP SN transmitter status of DRBs for which PDCP status preservation applies (i.e. for RLC AM). The uplink PDCP SN receiver status includes at least the PDCP SN of the first missing UL PDCP SDU and may include a bit map of the receive status of the out of sequence UL PDCP SDUs that the UE needs to retransmit in the target cell, if any. The downlink PDCP SN transmitter status indicates the next PDCP SN that the target gNB shall assign to new PDCP SDUs, not having a PDCP SN yet. The source gNB may omit sending this message if none of DRBs shall be treated with PDCP status preservation.

In case of DAPS Handover, the uplink PDCP SN receiver status and the downlink PDCP SN transmitter status are also conveyed for DRBs with RLC-UM, if simultaneously served by the source and the target gNB s. For DRBs which are not subject to be simultaneously served by the source and the target gNB s, the uplink PDCP SN receiver status and the downlink PDCP SN transmitter status are not conveyed in the SN STATUS TRANSFER message, if with RLC-UM. If with RLC-AM, then the description in step 707 applies, for which the normal data forwarding follows as defined in 9.2.3.2.3.NOTE: In case of DAPS Handover, the EARLY FORWARDING TRANSFER message is triggered by the source gNB in step 707, instead of the SN STATUS TRANSFER message. For DRBs subject to be simultaneously served by the source and the target gNBs, the DL COUNT value conveyed in the EARLY FORWARDING TRANSFER message indicates PDCP SN and HFN of the first PDCP SDU that the source gNB forwards to the target gNB. The source gNB does not stop assigning SNs to downlink PDCP SDUs until it sends the SN STATUS TRANSFER message to the target gNB in step 708*b*.

In case of DAPS Handover, for DRBs subject to be simultaneously served by the source and the target gNBs, the source gNB may additionally send the EARLY FORWARDING TRANSFER message(s) between step 707 and step 708*b*, to inform discarding of already forwarded PDCP SDUs, The target gNB does not transmit forwarded downlink PDCP SDUs to the UE, whose COUNT is less than the conveyed DL COUNT value and discards them if transmission has not been attempted already.

In step 708, the UE synchronises to the target cell and completes the RRC handover procedure by sending RRCReconfigurationComplete message to target gNB.

In step 708*a/b*, in case of DAPS Handover, the target gNB sends the HO SUCCESS message to the source gNB to inform that the UE has successfully accessed the target cell.

In return, the source gNB sends the last SN STATUS TRANSFER message to the target gNB as described in step 707 and the normal data forwarding follows.

In case of DAPS Handover, for DRBs subject to be simultaneously served by the source and the target gNBs for which duplication avoidance is required, the source gNB does not stop delivering uplink QoS flows to the UPF until it sends the SN STATUS TRANSFER message in step 708b. The target gNB does not forward QoS flows of the uplink PDCP SDUs successfully received in-sequence to the UPF until it receives the SN STATUS TRANSFER message, in which UL HFN and the first missing SN in the uplink PDCP SN receiver status indicates the start of uplink PDCP SDUs to be delivered to the UPF. The target gNB does not deliver any uplink PDCP SDUs which has an UL COUNT lower than the provided.

In step 709, the target gNB sends a PATH SWITCH REQUEST message to AMF to trigger 5GC to switch the DL data path towards the target gNB and to establish an NG-C interface instance towards the target gNB.

In step 710, 5GC switches the DL data path towards the target gNB. The UPF sends one or more "end marker" packets on the old path to the source gNB per PDU session/tunnel and then can release any U-plane/TNL resources towards the source gNB.

In step 711, the AMF confirms the PATH SWITCH REQUEST message with the PATH SWITCH REQUEST ACKNOWLEDGE message.

In step 712, upon reception of the PATH SWITCH REQUEST ACKNOWLEDGE message from the AMF, the target gNB sends the UE CONTEXT RELEASE to inform the source gNB about the success of the handover. The source gNB can then release radio and C-plane related resources associated to the UE context. Any ongoing data forwarding may continue.

The RRM configuration can include both beam measurement information (for layer 3 mobility) associated to SSB(s) and CSI-RS(s) for the reported cell(s) if both types of measurements are available. Also, if CA is configured, the RRM configuration can include the list of best cells on each frequency for which measurement information is available. And the RRM measurement information can also include the beam measurement for the listed cells that belong to the target gNB.

The common RACH configuration for beams in the target cell is only associated to the SSB(s). The network can have dedicated RACH configurations associated to the SSB(s) and/or have dedicated RACH configurations associated to CSI-RS(s) within a cell. The target gNB can only include one of the following RACH configurations in the Handover Command to enable the UE to access the target cell:

i) Common RACH configuration;

ii) Common RACH configuration+Dedicated RACH configuration associated with SSB;

iii) Common RACH configuration+Dedicated RACH configuration associated with CSI-RS.

The dedicated RACH configuration allocates RACH resource(s) together with a quality threshold to use them. When dedicated RACH resources are provided, they are prioritized by the UE and the UE shall not switch to contention-based RACH resources as long as the quality threshold of those dedicated resources is met. The order to access the dedicated RACH resources is up to UE implementation.

U-Plane handling for DAPS handover is described.

The U-plane handling during the Intra-NR-Access mobility activity for UEs in RRC_CONNECTED takes the following principles into account to avoid data loss during HO:

During HO preparation, U-plane tunnels can be established between the source gNB and the target gNB;

During HO execution, user data can be forwarded from the source gNB to the target gNB;

Forwarding should take place in order as long as packets are received at the source gNB from the UPF or the source gNB buffer has not been emptied.

During HO completion:

The target gNB sends a path switch request message to the AMF to inform that the UE has gained access and the AMF then triggers path switch related 5GC internal signalling and actual path switch of the source gNB to the target gNB in UPF;

The source gNB should continue forwarding data as long as packets are received at the source gNB from the UPF or the source gNB buffer has not been emptied.

A DAPS Handover can be used for an RLC-AM or RLC-UM bearer. For a DRB configured with DAPS, the following principles are additionally applied.

Downlink:

During HO preparation, a forwarding tunnel is always established.

The source gNB is responsible for allocating downlink PDCP SNs until the SN assignment is handed over to the target gNB and data forwarding takes place. That is, the source gNB does not stop assigning PDCP SNs to downlink packets until it receives the HANDOVER SUCCESS message and sends the SN STATUS TRANSFER message to the target gNB.

Upon allocation of downlink PDCP SNs by the source gNB, it starts scheduling downlink data on the source radio link and also starts forwarding downlink PDCP SDUs along with assigned PDCP SNs to the target gNB.

For security synchronization, HFN is maintained for the forwarded downlink SDUs with PDCP SNs assigned by the source gNB. The source gNB sends the EARLY STATUS TRANSFER message to convey the DL COUNT value, indicating PDCP SN and HFN of the first PDCP SDU that the source gNB forwards to the target gNB.

HFN and also PDCP SN are maintained after the SN assignment is handed over to the target gNB. The SN STATUS TRANSFER message indicates the next DL PDCP SN to allocate to a packet which does not have a PDCP sequence number yet, even for RLC-UM.

During handover execution period, the source and target gNBs separately perform ROHC header compression, ciphering, and adding PDCP header.

During handover execution period, the UE continues to receive downlink data from both source and target gNBs until the source gNB connection is released by an explicit release command from the target gNB.

During handover execution period, the UE DAPS PDCP maintains separate security and ROHC header decompression associated with each gNB, while maintaining common reordering function, duplicate detection, discard function, and PDCP SDUs in-sequence delivery to upper layers. PDCP SN continuity is supported for both RLC AM and UM DRBs configured with DAPS.

Uplink:
  The UE transmits UL data to the source gNB until the random access procedure toward the target gNB has been successfully completed. Afterwards the UE switches its UL data transmission to the target gNB.
  Even after switching its UL data transmissions, the UE continues to send UL layer 1 CSI feedback, HARQ feedback, layer 2 RLC feedback, ROHC feedback, HARQ data re-transmissions, and RLC data re-transmission to the source gNB.
  During handover execution period, the UE maintains separate security context and ROHC header compressor context for uplink transmissions towards the source and target gNBs. The UE maintains common UL PDCP SN allocation. PDCP SN continuity is supported for both RLC AM and UM DRBs configured with DAPS.
  During handover execution period, the source and target gNBs maintain their own security and ROHC header decompressor contexts to process UL data received from the UE.
  The establishment of a forwarding tunnel is optional.
  HFN and PDCP SN are maintained in the target gNB. The SN STATUS TRANSFER message indicates the first missing UL COUNT that the target should start delivering to the 5GC, even for RLC-UM.

Upon receiving DAPS handover command message, the UE suspends source cell SRBs, stops sending and receiving any RRC control plane signalling toward the source cell, and establishes SRBs for the target cell. The UE releases the source cell SRBs configuration upon receiving source cell release indication from the target cell after successful DAPS handover execution. When DAPS handover to the target cell fails and if the source cell link is available, then the UE reverts back to the source cell configuration and activate source cell SRBs for control plane signalling.

In NR, dual active protocol stack (DAPS) handover may be supported. This handover reduces interruption during handover close to 0 ms, that is, in line with the target, by maintaining the source cell radio link while establishing the target cell radio link. For this mobility enhancement, in Rel-17, mobility enhancement optimization will be studied in approved work item on enhancement of data collection for SON/MDT in NR.

The objective of this work item is to specify data collection enhancement in NR for Self-Organizing Networks (SON)/Minimization of Drive Tests (MDT) purpose.

For example, the specific objectives of this work is to support of data collection for SON features, including Coverage and Capacity Optimization (CCO), inter-system inter-RAT energy saving, 2-step RACH optimization, mobility enhancement optimization, and leftovers of Rel-16 SON/MDT WI (PCI selection, energy efficiency (OAM requirements), Successful Handovers Reports, UE history information in EN-DC). For example, solutions for the inter-node information exchange, including possible enhancements to S1/NG, X2/Xn, and F1/E1 interfaces are needed.

For example, the specific objectives of this work is to support of data collection for MDT features for identified use cases, including 2-step RACH optimization, leftovers of Rel-16 SON/MDT WI (MDT for MR-DC). For example, solutions for enhancement of logged and immediate MDT are needed. For example, solutions for enhancement of reporting e.g. RLF and accessibility measurements, Successful Handover reporting are needed. For example, solutions for MDT for MR-DC are needed.

Meanwhile, when the UE receives the DAPS related information included into the RRCReconfiguration message from the source gNB, the UE may decide to perform a legacy handover though the UE should do DAPS handover. It is because the UE may perceive that capability of the UE for DAPS handover is exceeded or the UE may not have the transmitting data toward the source gNB. In this case, the source gNB cannot know why RRC connection with the UE is disconnected. As a result, interruption during handover of this UE has no choice but to be increased.

Therefore, studies for supporting a DAPS handover procedure are needed.

Hereinafter, a method for supporting a DAPS handover procedure in a wireless communication system, according to some embodiments of the present disclosure, will be described.

Figure 8:
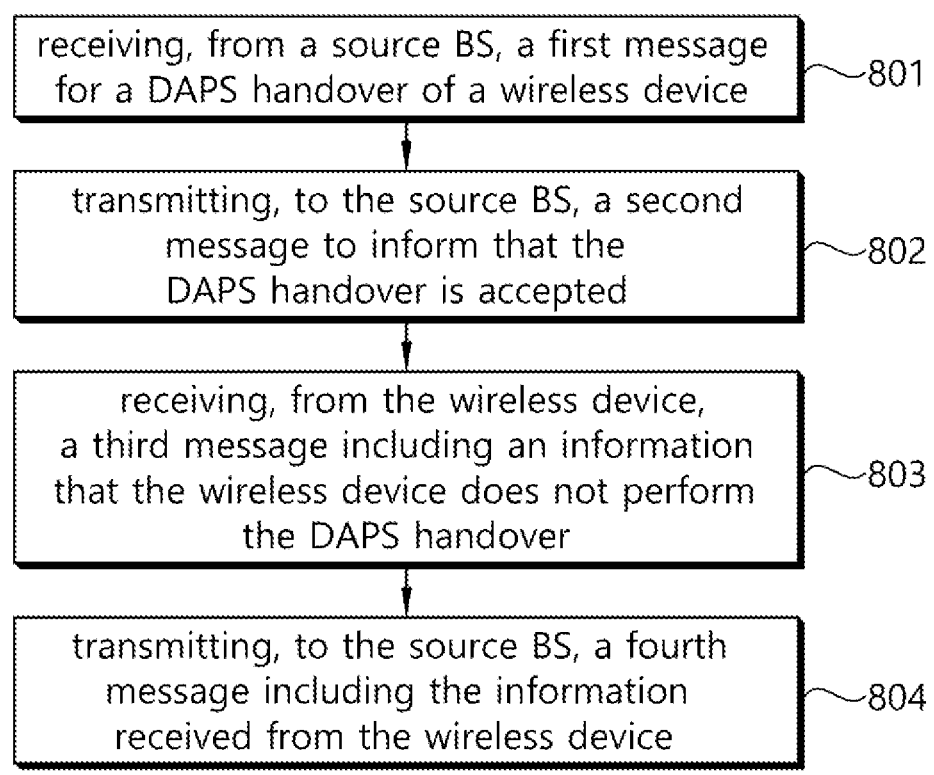
FIG. 8 shows an example of a method for supporting a DAPS handover procedure in a wireless communication system.

FIG. 8 shows an example of a method for supporting a DAPS handover procedure in a wireless communication system.

In particular, FIG. 8 shows an example of a method performed by a target base station (BS) in a wireless communication system.

In step 801, the target BS may receive, from a source BS, a first message for a DAPS handover of a wireless device.

The data transmission between the source BS and the wireless device may be maintained during the DAPS handover.

For example, DAPS Handover may be a handover procedure that maintains the source BS connection with the wireless device, after reception of RRC message for handover and until releasing the source BS after successful random access to the target BS.

For example, in case of DAPS handover, the wireless device may continue the downlink user data reception from the source BS until releasing the source BS and continue the uplink user data transmission to the source BS until successful random access procedure to the target BS.

For example, the wireless device may establish the Radio Link Control (RLC) entity and an associated Downlink Traffic Channel (DTCH) logical channel for target BS for each data radio bearer (DRB) configured with DAPS.

For example, the wireless device, for the DRB configured with DAPS, may reconfigure the PDCP entity with separate security and RObust Header Compression (ROHC) functions for the source BS and the target BS and associate them with the RLC entities configured by the source BS and the target BS respectively.

For example, after the source BS decides to handover the UE, the source BS may issue a Handover Request message to the target BS passing a transparent RRC container with necessary information to prepare the handover at the target side. The source BS may also request a DAPS Handover for some DRBs.

In step 802, the target BS may transmit, to the source BS, a second message to inform that the DAPS handover is accepted.

For example, on receiving the request message in step 801, the target BS may perform admission control and prepare the handover with L1 and/or L2. The target BS may send the Handover Request Acknowledge message to the source BS. The second message may include a transparent container to be sent to the UE as an RRC message to perform the handover. The target BS may also indicate whether a DAPS Handover is accepted.

In step 803, the target BS may receive, from the wireless device, a third message including an information that the wireless device does not perform the DAPS handover.

For example, the third message may include a legacy handover indication informing that the wireless device does not perform the DAPS handover.

In step 804, the target BS may transmit, to the source BS, a fourth message including the information received from the wireless device.

For example, the fourth message may include the received legacy handover indication.

For another example, the target BS may generate a legacy handover indication informing that the wireless device does not perform the DAPS handover. The target BS may include the generated legacy handover indication in the fourth message.

According to some embodiments of the present disclosure, the third message may be a Radio Resource Control (RRC) Reconfiguration Complete message.

For example, the wireless device may synchronize to the target BS and complete the RRC handover procedure by sending an RRC Reconfiguration Complete message to the target BS. This RRC message may include the Legacy HO Indication to indicate that the wireless device perform not a DAPS handover but a legacy handover. This indication may contain the DAPS handover related information received by the source BS.

In this case, the fourth message may be a Handover Success message in response to the RRC Reconfiguration Complete message. The Handover Success message may inform that the wireless device has successfully accessed to the target BS.

For example, on receiving the RRC message including an indication, the target BS may send the HO Success message to the source BS to inform that the wireless device has successfully accessed the target cell. This message may forward the Legacy HO Indication included into the RRC message received from the wireless device. The source BS may decide to change the criteria or condition for decision of DAPS handover if this indication is received frequently.

According to some embodiments of the present disclosure, the target BS may transmit, to a core network node (for example, an Access and Mobility management Function (AMF)), a Path Switch Request message for switching a downlink data path towards the target BS.

The target BS may receive, from the core network node, a Path Switch Request Acknowledgement message to confirm the switching of the downlink data path.

In this case, the third message may be a Radio Resource Control (RRC) Reconfiguration Complete message. The fourth message may be a UE Context Release message informing that the wireless device has access to the target BS.

For example, the target BS may send a Path Switch Request message to AMF to trigger 5GC to switch the DL data path towards the target BS and to establish an NG-C interface instance towards the target BS. The AMF may confirm the Path Switch Request message with the Path Switch Request Acknowledge message after the 5GC switches the DL data path towards the target BS.

For example, upon receipt of the message from the AMF, the target BS may send the UE Context Release message to inform the source BS about the success of the handover. This message may include the legacy handover indication. The source BS may decide to change the criteria or condition for decision of DAPS handover if this indication is received frequently.

According to some embodiments of the present disclosure, the target BS may transmit, to the wireless device, a fifth message to request an information informing whether the wireless device has performed the DAPS handover or not.

In this case, the third message may be a UE Information Response message in response to the fifth message. The fourth message may be a Successful Handover Report message based on the third message.

For example, the target BS may send the UE Information Request message to the UE. This message may include an indication to inform the target BS that the UE performs a legacy handover instead of the DAPS handover. This indication may also be transferred by the source BS via the RRC Reconfiguration message.

For example, based on the received indication, the wireless device may transmit the UE Information Response message including the Legacy HO Indication to the target gNB.

For example, on receiving the RRC message including an indication, the target BS may send the Successful Handover Report message with the Legacy HO Indication contained into the received RRC message to the source BS. The source BS may decide to change the criteria or condition for decision of DAPS handover if this indication is received frequently.

Figure 9:
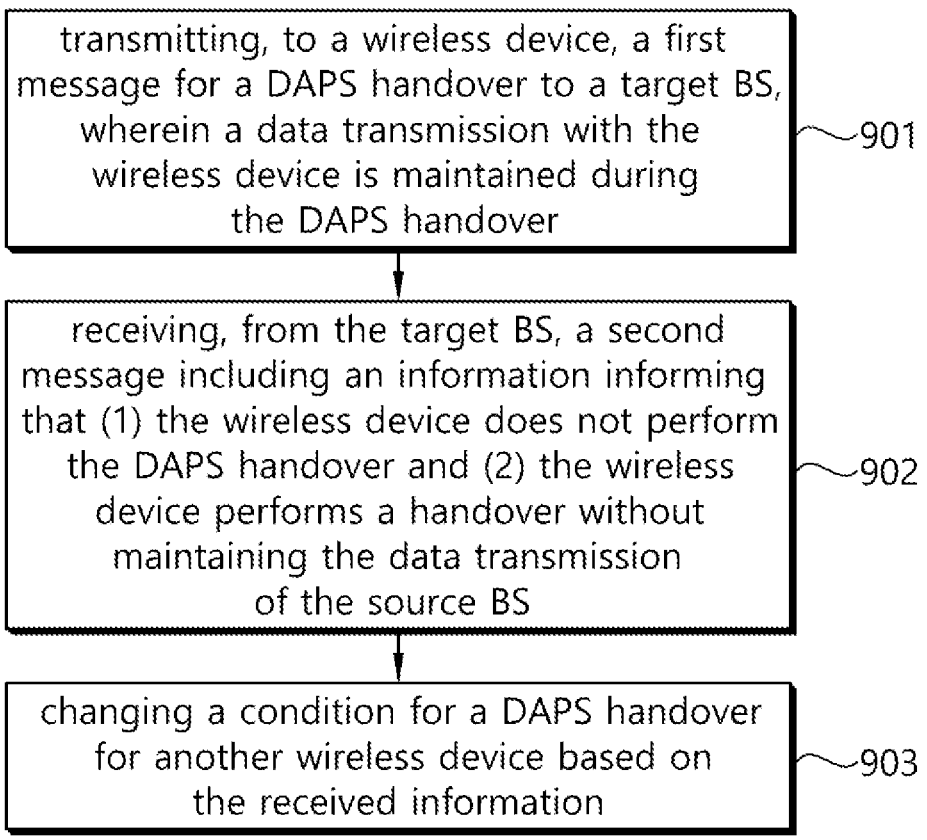
FIG. 9 shows an example of a method for supporting a DAPS handover procedure in a wireless communication system.

FIG. 9 shows an example of a method for supporting a DAPS handover procedure in a wireless communication system.

In particular, FIG. 9 shows an example of a method performed by a source base station (BS) in a wireless communication system.

In step 901, the source BS may transmit, to a wireless device, a first message for a DAPS handover to a target BS. The source BS may maintain a data transmission with the wireless device during the DAPS handover.

For example, the first message may be a RRC Reconfiguration message including an information for accessing the target cell.

For example, the source BS may receive, from the wireless device, measurement reports according to measurement configuration. After the source BS decides to handover the wireless device, the source BS may issue a Handover Request message to the target BS passing a transparent RRC container with necessary information to prepare the handover at the target side. The source BS may also request a DAPS Handover for some DRBs. On receiving the request message, the target BS perform admission control and prepare the handover with L1/L2. Then the target BS may send the Handover Request Acknowledge message to the source BS, which includes a transparent container to be sent to the wireless device as an RRC message to perform the handover. The target BS may also indicate whether a DAPS Handover is accepted. When to receive the message from the target BS, the source BS may trigger the Uu handover by sending an RRC Reconfiguration message to the wireless device, containing the information required to access the target BS.

In step 902, the source BS may receive, from the target BS, a second message including an information informing that (1) the wireless device does not perform the DAPS handover and (2) the wireless device performs a handover without maintaining the data transmission of the source BS. The information may be forwarded from the wireless device.

For example, the second message may be a Handover Success message informing that the wireless device has accessed the target BS.

In step 903, the source BS may change a condition for a DAPS handover for another wireless device based on the received information.

For example, the source BS may trigger a DAPS handover for the other wireless device based on the changed condition.

According to some embodiments of the present disclosure, the source BS may change the measurement configuration of another wireless device so that the target BS is not selected for the DAPS handover, since DAPS handover is not properly performed.

According to some embodiments of the present disclosure, the source BS may change resource allocation for DAPS handover. For example, upon sending handover signal to the target BS and/or receiving handover signal from the target BS for DAPS handover, the source BS may change resource allocation for DAPS handover.

For example, for DAPS handover, the source BS may allocate 3 DRBs and the target gNB may allocate 1 DRB. When the legacy handover indication is continuously received, the source BS may change the resource for the DAPS handover to provide only 2 DRBs. Since, the source BS allocates proper resource for the DAPS handover, the wireless device could avoid the inability to perform DAPS handover due to insufficient capability.

According to some embodiments of the present disclosure, if a wireless device and a target BS support of multiple bands, the source gNB may change a current band to another band for a DAPS handover, when the legacy handover indication is continuously received.

For example, the wireless device and the target gNB may support band #1 and band #2. In addition, the band #1 and the band #2 may be available for the DAPS handover. In this case, if the DAPS handover is configured for band #1, and if the legacy HO indication is continuously received, the source BS may change the configuration for the DAPS handover to perform the DAPS handover in band #2.

Figure 10:
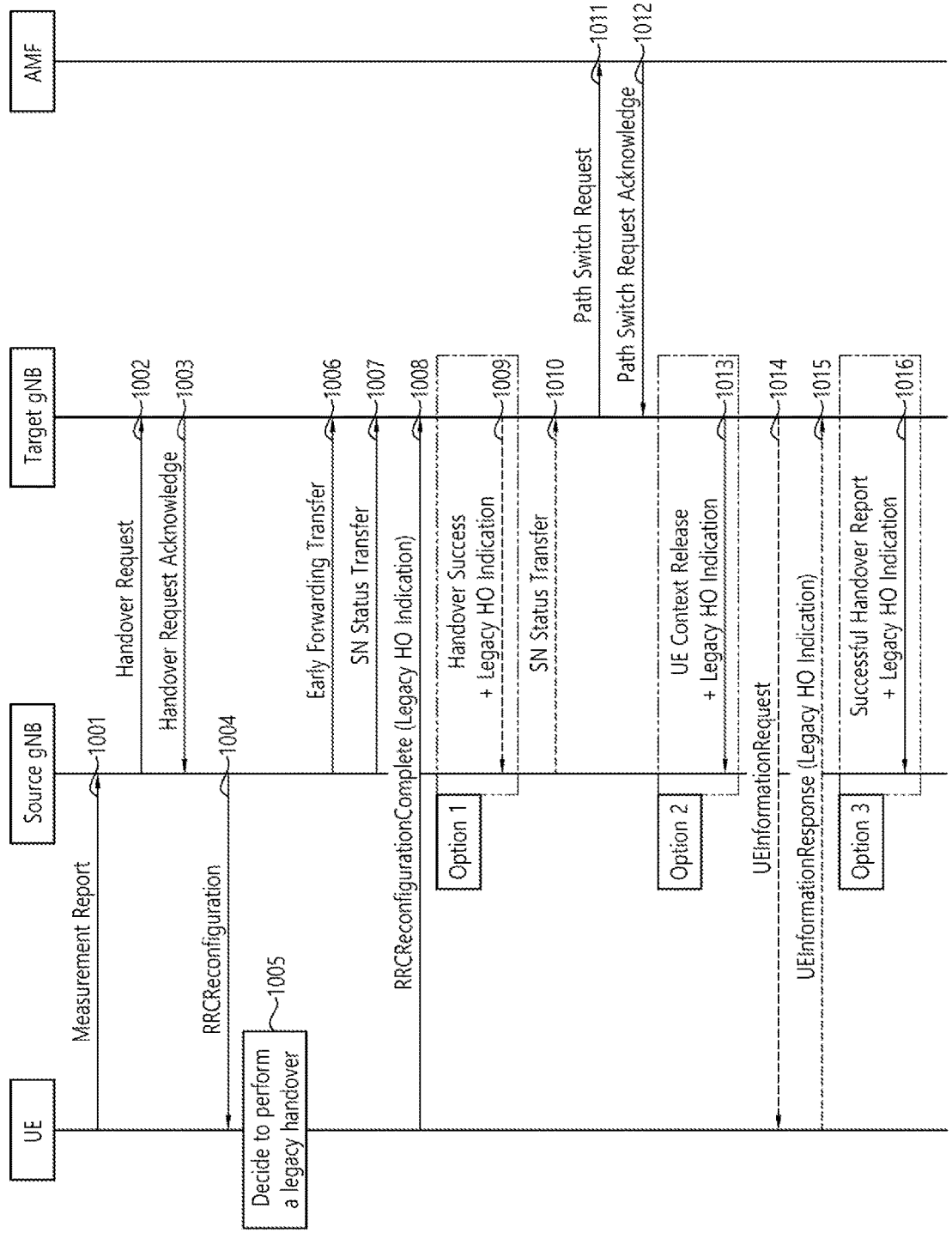
FIG. 10 shows an example of a procedure for informing the source gNB of legacy handover of the UE in a wireless communication system, according to some embodiments of the present disclosure.

FIG. 10 shows an example of a procedure for informing the source gNB of legacy handover of the UE in a wireless communication system, according to some embodiments of the present disclosure.

According to some embodiments of the present disclosure, the target gNB may provide the source gNB with an indication to inform that a legacy handover for the UE has been performed though the source gNB requests a DAPS handover for the UE and the target gNB accepts it. If the source gNB receives this indication frequently, the source gNB may decide to change the criteria or condition for decision of DAPS handover.

In step 1001, the UE may report according to the measurement configuration.

In step 1002, after the source gNB decides to handover the UE, the source gNB may issue a Handover Request message to the target gNB by passing a transparent RRC container with necessary information to prepare the handover at the target side. The source gNB may also request a DAPS Handover for some DRBs.

In step 1003, on receiving the request message, the target gNB may perform admission control and prepare the handover with L1/L2. Then, the target gNB may send the Handover Request Acknowledge message to the source gNB, which includes a transparent container to be sent to the UE as an RRC message to perform the handover. The target gNB also indicates if a DAPS Handover is accepted.

In step 1004, when to receive the message from the target gNB, the source gNB may trigger the Uu handover by sending an RRCReconfiguration message to the UE, containing the information required to access the target cell.

In step 1005, upon receipt of the RRC message, the UE may decide to perform a legacy handover, because the UE may perceive that capability of the UE for DAPS handover is exceeded or the UE may not have the transmitting data toward the source gNB.

In step 1006, for DRBs configured with DAPS, the source gNB may send the Early Forwarding Transfer message.

In step 1007, for DRBs not configured with DAPS, the source gNB may send the SN Status Transfer message to the target gNB to convey the uplink PDCP SN receiver status and the downlink PDCP SN transmitter status of DBRs for which PDCP status preservation applies.

In step 1008, the UE may synchronize to the target cell and complete the RRC handover procedure by sending RRCReconfigurationComplete message to target gNB. This RRC message may include the Legacy HO Indication to indicate that the UE performs not a DAPS handover but a legacy handover. This indication may contain the DAPS handover related information received by the source gNB in step 1004.

According to when the Legacy HO Indication is transmitted to the source gNB, there may be three options such as steps 1009, 1013, and 1016.

Option 1.

In step 1009, on receiving the RRC message including an indication, the target gNB may send the HO Success message to the source gNB to inform that the UE has successfully accessed the target cell. This message may forward the Legacy HO Indication included into the RRC message received from the UE. The source gNB may decide to change the criteria or condition for decision of DAPS handover if this indication is received frequently.

In step 1010, the source gNB may send the SN Status Transfer message for DRBs configured with DAPS.

In step 1011, the target gNB may send a Path Switch Request message to AMF to trigger 5GC to switch the DL data path towards the target gNB and to establish an NG-C interface instance towards the target gNB.

In step 1012, the AMF may confirm the Path Switch Request message with the Path Switch Request Acknowledge message after the 5GC switches the DL data path towards the target gNB.

Option 2.

In step 1013, upon receipt of the message from the AMF, the target gNB may send the UE Context Release message to inform the source gNB about the success of the handover. If the target gNB has not forwarded the Legacy HO Indication received from the UE to the source gNB in step 1009, this message may include this indication. The source gNB may decide to change the criteria or condition for decision of DAPS handover if this indication is received frequently.

In step 1014, if the Legacy HO Indication is not provided by the UE in step 1008, the target gNB may send the UEInformationRequest message to the UE. This message may include an indication to inform the target gNB if the UE performs a legacy handover though it should do DAPS HO.

For example, this indication may also be transferred by the source gNB in step 1004 via the RRCReconfiguration message or before step 1004 via the UEInformationRequest message. In this case, step 1014 and 1015 are not necessary.

In step 1015, based on the received indication, the UE may transmit the UEInformationResponse message including the Legacy HO Indication to the target gNB.

Option 3.

In step 1016, on receiving the RRC message including an indication, the target gNB may send the Successful Handover Report, new, or existing message with the Legacy HO Indication contained into the received RRC message to the source gNB.

If the target gNB does not provide the Legacy HO Indication received in step 1008 to the source gNB in step 1009 and 1013, irrespective of step 1014 and 1015, the target gNB may send the Successful Handover Report, new, or existing message with the Legacy HO Indication to the source gNB. The source gNB may decide to change the criteria or condition for decision of DAPS handover if this indication is received frequently.

Hereinafter, an apparatus for supporting a DAPS handover procedure in a wireless communication system, according to some embodiments of the present disclosure, will be described.

For example, a source BS and a target BS may be a base station 200 in FIG. 1, respectively.

According to some embodiments of the present disclosure, a target base station (BS) may include a processor, and a memory. For example, the processor may be configured to be coupled operably with the memory.

The processor may be configured to control the transceiver to receive, from a source BS, a first message for a dual active protocol stack (DAPS) handover of a wireless device. The processor may be configured to control the transceiver to transmit, to the source BS, a second message to inform that the DAPS handover is accepted. The processor may be configured to control the transceiver to receive, from the wireless device, a third message including an information that the wireless device does not perform the DAPS handover. The processor may be configured to control the transceiver to transmit, to the source BS, a fourth message including the information received from the wireless device. For example, a data transmission between the source BS and the wireless device may be maintained during the DAPS handover.

According to some embodiments of the present disclosure, the third message may include a legacy handover indication informing that the wireless device does not perform the DAPS handover. For example, the fourth message may include the received legacy handover indication.

According to some embodiments of the present disclosure, the processor may be configured to generate a legacy handover indication informing that the wireless device does not perform the DAPS handover. The processor may be configured to include the generated legacy handover indication in the fourth message.

According to some embodiments of the present disclosure, the third message may be a Radio Resource Control (RRC) Reconfiguration Complete message. For example, the fourth message may be a handover Success message in response to the RRC Reconfiguration Complete message. The handover Success message may inform that the wireless device has successfully accessed to the target BS.

According to some embodiments of the present disclosure, the processor may be configured to control the transceiver to transmit, to a core network node, a path switch request message for switching a downlink data path towards the target BS. For example, the processor may be configured to control the transceiver to receive, form the core network node, a path switch request acknowledgement message to confirm the switching of the downlink data path.

In this case, the fourth message may be a UE Context Release message informing that the wireless device has access to the target BS.

According to some embodiments of the present disclosure, the processor may be configured to control the transceiver to transmit, to the wireless device, a fifth message to request an information informing whether the wireless device has performed the DAPS handover or not.

In this case, the third message may be a UE information response message in response to the fifth message. The fourth message may be a successful handover report based on the third message.

According to some embodiments of the present disclosure, a source base station (BS) may include a processor, and a memory. For example, the processor may be configured to be coupled operably with the memory.

The processor may be configured to control the transceiver to transmit, to a wireless device, a first message for a dual active protocol stack (DAPS) handover to a target BS. A data transmission with the wireless device may be maintained during the DAPS handover. The processor may be configured to control the transceiver to receive, from the target BS, a second message including an information informing that (1) the wireless device does not perform the DAPS handover and (2) the wireless device performs a handover without maintaining the data transmission of the source BS. The information may be forwarded from the wireless device. The processor may be configured to change a condition for a DAPS handover for another wireless device based on the received information.

For example, the first message may be a RRC Reconfiguration message including an information for accessing the target cell.

For example, the second message may be a handover Success message informing that the wireless device has accessed the target BS.

For example, the processor may be configured to trigger a DAPS handover for the other wireless device based on the changed condition.

Hereinafter, a processor for a target BS for supporting a DAPS handover procedure in a wireless communication system, according to some embodiments of the present disclosure, will be described.

The processor may be configured to control the target BS to receive, from a source BS, a first message for a dual active protocol stack (DAPS) handover of a wireless device. The processor may be configured to control the target BS to transmit, to the source BS, a second message to inform that the DAPS handover is accepted. The processor may be configured to control the target BS to receive, from the wireless device, a third message including an information that the wireless device does not perform the DAPS handover. The processor may be configured to control the target BS to transmit, to the source BS, a fourth message including the information received from the wireless device. For example, a data transmission between the source BS and the wireless device may be maintained during the DAPS handover.

According to some embodiments of the present disclosure, the third message may include a legacy handover indication informing that the wireless device does not perform the DAPS handover. For example, the fourth message may include the received legacy handover indication.

According to some embodiments of the present disclosure, the processor may be configured to control the target BS to generate a legacy handover indication informing that the wireless device does not perform the DAPS handover. The processor may be configured to control the target BS to include the generated legacy handover indication in the fourth message.

According to some embodiments of the present disclosure, the third message may be a Radio Resource Control (RRC) Reconfiguration Complete message. For example, the fourth message may be a handover Success message in response to the RRC Reconfiguration Complete message. The handover Success message may inform that the wireless device has successfully accessed to the target BS.

According to some embodiments of the present disclosure, the processor may be configured to control the target BS to transmit, to a core network node, a path switch request message for switching a downlink data path towards the target BS. For example, the processor may be configured to control the target BS to receive, form the core network node, a path switch request acknowledgement message to confirm the switching of the downlink data path.

In this case, the fourth message may be a UE Context Release message informing that the wireless device has access to the target BS.

According to some embodiments of the present disclosure, the processor may be configured to control the target BS to transmit, to the wireless device, a fifth message to request an information informing whether the wireless device has performed the DAPS handover or not.

In this case, the third message may be a UE information response message in response to the fifth message. The fourth message may be a successful handover report based on the third message.

Hereinafter, a processor for a source BS for supporting a DAPS handover procedure in a wireless communication system, according to some embodiments of the present disclosure, will be described.

The processor may be configured to control the source BS to transmit, to a wireless device, a first message for a dual active protocol stack (DAPS) handover to a target BS. A data transmission with the wireless device may be maintained during the DAPS handover. The processor may be configured to control the source BS to receive, from the target BS, a second message including an information informing that (1) the wireless device does not perform the DAPS handover and (2) the wireless device performs a handover without maintaining the data transmission of the source BS. The information may be forwarded from the wireless device. The processor may be configured to control the source BS to change a condition for a DAPS handover for another wireless device based on the received information.

For example, the first message may be a RRC Reconfiguration message including an information for accessing the target cell.

For example, the second message may be a handover Success message informing that the wireless device has accessed the target BS.

For example, the processor may be configured to control the source BS to trigger a DAPS handover for the other wireless device based on the changed condition.

Hereinafter, a non-transitory computer-readable medium has stored thereon a plurality of instructions for supporting a DAPS handover procedure_in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a target base station (BS) in a wireless communication system.

The stored a plurality of instructions may cause the target BS to receive, from a source BS, a first message for a dual active protocol stack (DAPS) handover of a wireless device. The stored a plurality of instructions may cause the target BS to transmit, to the source BS, a second message to inform that the DAPS handover is accepted. The stored a plurality of instructions may cause the target BS to receive, from the wireless device, a third message including an information that the wireless device does not perform the DAPS handover. The stored a plurality of instructions may cause the target BS to transmit, to the source BS, a fourth message including the information received from the wireless device. For example, a data transmission between the source BS and the wireless device may be maintained during the DAPS handover.

According to some embodiments of the present disclosure, the third message may include a legacy handover indication informing that the wireless device does not perform the DAPS handover. For example, the fourth message may include the received legacy handover indication.

According to some embodiments of the present disclosure, the stored a plurality of instructions may cause the target BS to generate a legacy handover indication informing that the wireless device does not perform the DAPS handover. The stored a plurality of instructions may cause the target BS to include the generated legacy handover indication in the fourth message. According to some embodiments of the present disclosure, the third message may be a Radio Resource Control (RRC) Reconfiguration Complete message. For example, the fourth message may be a handover Success message in response to the RRC Reconfiguration Complete message. The handover Success message may inform that the wireless device has successfully accessed to the target BS.

According to some embodiments of the present disclosure, the stored a plurality of instructions may cause the target BS to transmit, to a core network node, a path switch request message for switching a downlink data path towards the target BS. For example, the stored a plurality of instructions may cause the target BS to receive, form the core network node, a path switch request acknowledgement message to confirm the switching of the downlink data path.

In this case, the fourth message may be a UE Context Release message informing that the wireless device has access to the target BS.

According to some embodiments of the present disclosure, the stored a plurality of instructions may cause the target BS to transmit, to the wireless device, a fifth message to request an information informing whether the wireless device has performed the DAPS handover or not.

In this case, the third message may be a UE information response message in response to the fifth message. The fourth message may be a successful handover report based on the third message.

According to some embodiment of the present disclosure, a non-transitory computer-readable medium has stored thereon a plurality of instructions. The stored a plurality of instructions may be executed by a processor of a source base station (BS) in a wireless communication system.

The stored a plurality of instructions may cause the source BS to transmit, to a wireless device, a first message for a dual active protocol stack (DAPS) handover to a target BS. A data transmission with the wireless device may be maintained during the DAPS handover. The stored a plurality of instructions may cause the source BS to receive, from the target BS, a second message including an information informing that (1) the wireless device does not perform the DAPS handover and (2) the wireless device performs a handover without maintaining the data transmission of the source BS. The information may be forwarded from the wireless device. The stored a plurality of instructions may cause the source BS to change a condition for a DAPS handover for another wireless device based on the received information.

For example, the first message may be a RRC Reconfiguration message including an information for accessing the target cell.

For example, the second message may be a handover Success message informing that the wireless device has accessed the target BS.

For example, the stored a plurality of instructions may cause the source BS to trigger a DAPS handover for the other wireless device based on the changed condition.

The present disclosure may have various advantageous effects.

According to some embodiments of the present disclosure, a Radio Access Network (RAN) node (for example, a base station such as an eNB or a gNB) could efficiently support a DAPS handover procedure in a wireless communication system.

For example, the source BS can identify that a legacy handover for the UE was performed though the source BS determined a DAPS handover for the UE.

For example, based on this knowledge, the source BS can optimize the criteria or condition for decision of a DAPS handover.

For example, it could be prevented to perform a legacy handover for the UE which should do a DAPS handover.

According to some embodiments of the present disclosure, a wireless communication system could provide an efficient solution for supporting a DAPS handover procedure.

For example, a wireless communication system could avoid the degradation of UE's experience by reducing interruption through DAPS handover.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising,
receiving, by a target base station (BS) from a source BS, a first message for a dual active protocol stack handover of a wireless device;
transmitting, by the target BS to the source BS, a second message to inform that the dual active protocol stack handover is accepted;
receiving, by the target BS from the wireless device, a third message including an information that the wireless device does not perform the dual active protocol stack handover,
wherein the third message includes a legacy handover indication informing that the wireless device does not perform the dual active protocol stack handover; and
transmitting, by the target BS to the source BS, a fourth message including the information received from the wireless device,
wherein the fourth message includes the legacy handover indication informing that the wireless device does not perform the dual active protocol stack handover, and
wherein a data transmission between the source BS and the wireless device is maintained during the dual active protocol stack handover.

2. The method of claim 1, wherein the third message is a Radio Resource Control (RRC) Reconfiguration Complete message.

3. The method of claim 2, wherein the fourth message is a Handover Success message in response to the RRC Reconfiguration Complete message, wherein the Handover Success message informs that the wireless device has successfully accessed to the target BS.

4. The method of claim 1, wherein the method further comprises,
transmitting, by the target BS to a core network node, a Path Switch Request message for switching a downlink data path towards the target BS.

5. The method of claim 4, wherein the method further comprises,
receiving, by the target BS from the core network node, a Path Switch Request Acknowledgement message to confirm the switching of the downlink data path.

6. The method of claim 5, wherein the fourth message is a UE Context Release message informing that the wireless device has access to the target BS.

7. The method of claim 1, wherein the method further comprises,
transmitting, by the target BS to the wireless device, a fifth message to request an information informing whether the wireless device has performed the dual active protocol stack handover or not.

8. The method of claim 7, wherein the third message is a UE Information Response message in response to the fifth message.

9. The method of claim 8, wherein the fourth message is a Successful Handover Report message based on the third message.

10. A target base station (BS), comprising:
a memory;
a transceiver; and
at least one processor operatively coupled to the memory and the transceiver, and configured to:
control the transceiver to receive, from a source BS, a first message for a dual active protocol stack handover of a wireless device;
control the transceiver to transmit, to the source BS, a second message to inform that the dual active protocol stack handover is accepted;
control the transceiver to receive, from the wireless device, a third message including an information that the wireless device does not perform the dual active protocol stack handover,
wherein the third message includes a legacy handover indication informing that the wireless device does not perform the dual active protocol stack handover; and
control the transceiver to transmit, to the source BS, a fourth message including the information received from the wireless device,
wherein the fourth message includes the legacy handover indication informing that the wireless device does not perform the dual active protocol stack handover, and
wherein a data transmission between the source BS and the wireless device is maintained during the dual active protocol stack handover.

11. The target BS of claim 10, wherein the third message is a Radio Resource Control (RRC) Reconfiguration Complete message.

12. The target BS of claim 11, wherein the fourth message is a handover Success message in response to the RRC Reconfiguration Complete message, wherein the handover Success message informs that the wireless device has successfully accessed to the target BS.

* * * * *